(12) United States Patent
Portwood (10) Patent No.: US 9,890,625 B2
(45) Date of Patent: *Feb. 13, 2018

(54) SYSTEMS AND METHODS FOR THE TREATMENT OF OIL AND/OR GAS WELLS WITH AN OBSTRUCTION MATERIAL

(71) Applicant: Eclipse IOR Services, LLC, North Richland Hills, TX (US)

(72) Inventor: J. Thomas Portwood, Keller, TX (US)

(73) Assignee: Eclipse IOR Services, LLC, North Richland Hills, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,383

(22) Filed: Mar. 14, 2014

(65) Prior Publication Data
US 2015/0247393 A1 Sep. 3, 2015

Related U.S. Application Data

(60) Provisional application No. 61/945,935, filed on Feb. 28, 2014.

(51) Int. Cl.
*E21B 43/16* (2006.01)
*C09K 8/00* (2006.01)

(52) U.S. Cl.
CPC .............. *E21B 43/164* (2013.01); *C09K 8/00* (2013.01)

(58) Field of Classification Search
None
See application file for complete search history.

(56) References Cited

U.S. PATENT DOCUMENTS 3,060,210 A 4/1961 De Groote
3,047,062 A 7/1962 Meadors
(Continued)

FOREIGN PATENT DOCUMENTS

CN 102127414 A 7/2011
CN 102277143 B 3/2013
(Continued)

OTHER PUBLICATIONS

Hirsch; Surface Active Agents (Surfactants); Sep. 25, 2015; pp. 1-5; http://knowledge.ulprospector.com/3106/pc-surface-active-agents-surfactants/.*

(Continued)

*Primary Examiner* — Anuradha Ahuja
(74) *Attorney, Agent, or Firm* — Wolf, Greenfield & Sacks, P.C.

(57) ABSTRACT

Systems and methods for the treatment of oil and/or gas wells are generally provided. In some embodiments, a reservoir comprising oil and/or gas may contain regions that differ in permeability to the drive fluid used to displace the oil and/or gas. The higher permeability region(s) may limit oil and/or gas recovery from lower permeability regions. A method of enhancing oil and/or gas recovery in such a reservoir may comprise injecting a fluid comprising a microemulsion into the reservoir prior to obstructing one or more region (e.g., higher permeability regions) of the reservoir. The use of a microemulsion prior to obstructing one or more region of the reservoir may enhance the barrier properties of the resulting obstruction. In some embodiments, injecting a fluid comprising a microemulsion into the reservoir may also increase the overall production of the oil and/or gas well lacking the microemulsion treatment.

13 Claims, 3 Drawing Sheets

(56) References Cited

U.S. PATENT DOCUMENTS

| | | | |
|---|---|---|---|
| 3,347,789 A | 10/1967 | Dickson et al. | |
| 3,368,624 A | 2/1968 | Heuer et al. | |
| 3,483,923 A | 12/1969 | Darley | |
| 3,710,865 A | 1/1973 | Kiel | |
| 3,756,319 A | 9/1973 | Holm et al. | |
| 3,760,881 A | 9/1973 | Kiel | |
| 3,850,248 A | 11/1974 | Carney | |
| 3,919,411 A | 11/1975 | Glass et al. | |
| 4,005,020 A | 1/1977 | McCormick | |
| 4,206,809 A | 6/1980 | Jones | |
| 4,233,165 A | 11/1980 | Salathiel et al. | |
| 4,276,935 A | 7/1981 | Hessert et al. | |
| 4,360,061 A | 11/1982 | Canter et al. | |
| 4,414,128 A | 11/1983 | Goffinet | |
| 4,472,291 A | 9/1984 | Rosano | |
| 4,511,488 A | 4/1985 | Matta | |
| 4,650,000 A | 3/1987 | Andreasson et al. | |
| 4,844,756 A | 7/1989 | Forsberg | |
| 4,951,921 A * | 8/1990 | Stahl et al. | 166/270 |
| 5,008,026 A | 4/1991 | Gardner et al. | |
| 5,034,140 A | 7/1991 | Gardner et al. | |
| 5,076,362 A * | 12/1991 | Beardmore | 166/269 |
| 5,076,954 A | 12/1991 | Loth et al. | |
| 5,083,613 A | 1/1992 | Gregoli et al. | |
| 5,095,989 A | 3/1992 | Prukop | |
| 5,217,531 A | 6/1993 | Cheung | |
| 5,247,995 A | 9/1993 | Tjon-Joe-Pin et al. | |
| 5,310,002 A | 5/1994 | Blauch et al. | |
| 5,356,482 A | 10/1994 | Mehta et al. | |
| 5,567,675 A | 10/1996 | Romocki | |
| 5,587,354 A | 12/1996 | Duncan, Jr. | |
| 5,587,357 A | 12/1996 | Rhinesmith | |
| 5,604,195 A | 2/1997 | Misselyn et al. | |
| 5,652,200 A | 7/1997 | Davies et al. | |
| 5,665,689 A | 9/1997 | Durbut | |
| 5,676,763 A | 10/1997 | Salisbury et al. | |
| 5,697,458 A | 12/1997 | Carney | |
| 5,707,940 A | 1/1998 | Bush et al. | |
| 5,762,138 A | 6/1998 | Ford et al. | |
| 5,784,386 A | 7/1998 | Norris | |
| 5,811,383 A | 9/1998 | Klier et al. | |
| 5,830,831 A | 11/1998 | Chan et al. | |
| 5,874,386 A | 2/1999 | Chan et al. | |
| 5,925,233 A | 7/1999 | Miller et al. | |
| 5,975,206 A | 11/1999 | Woo et al. | |
| 5,977,032 A | 11/1999 | Chan | |
| 5,990,072 A | 11/1999 | Gross et al. | |
| 5,996,692 A | 12/1999 | Chan et al. | |
| 6,046,140 A | 4/2000 | Woo et al. | |
| 6,090,754 A | 7/2000 | Chan et al. | |
| 6,110,885 A | 8/2000 | Chan | |
| 6,112,814 A | 9/2000 | Chan et al. | |
| 6,165,946 A | 12/2000 | Mueller et al. | |
| 6,173,776 B1 | 1/2001 | Furman et al. | |
| 6,191,090 B1 | 2/2001 | Mondin et al. | |
| 6,228,830 B1 | 5/2001 | Vlasblom | |
| 6,260,621 B1 | 7/2001 | Furman et al. | |
| 6,302,209 B1 | 10/2001 | Thompson, Sr. et al. | |
| 6,364,020 B1 | 4/2002 | Crawshaw et al. | |
| 6,486,115 B1 | 11/2002 | Weaver et al. | |
| 6,581,687 B2 | 6/2003 | Collins et al. | |
| 6,593,279 B2 | 7/2003 | Von Krosigk et al. | |
| 6,613,720 B1 | 9/2003 | Feraud et al. | |
| 6,729,402 B2 | 5/2004 | Chang et al. | |
| 6,770,603 B1 | 8/2004 | Sawdon et al. | |
| 6,793,025 B2 | 9/2004 | Patel et al. | |
| 6,800,593 B2 | 10/2004 | Dobson, Jr. et al. | |
| 6,818,595 B2 | 11/2004 | Benton et al. | |
| 6,911,417 B2 | 6/2005 | Chan et al. | |
| 6,914,040 B2 | 7/2005 | Deak et al. | |
| 6,939,832 B2 | 9/2005 | Collins | |
| 6,984,610 B2 | 1/2006 | VonKrosigk et al. | |
| 7,021,378 B2 | 4/2006 | Prukop | |
| 7,122,509 B2 | 10/2006 | Sanner et al. | |
| 7,134,496 B2 | 11/2006 | Jones et al. | |
| 7,205,262 B2 | 4/2007 | Schwartz et al. | |
| 7,205,264 B2 | 4/2007 | Boles | |
| 7,231,976 B2 | 6/2007 | Berry et al. | |
| 7,380,606 B2 | 6/2008 | Pursley et al. | |
| 7,392,844 B2 | 7/2008 | Berry et al. | |
| 7,407,915 B2 | 8/2008 | Jones et al. | |
| 7,468,402 B2 | 12/2008 | Yang et al. | |
| 7,481,273 B2 | 1/2009 | Javora et al. | |
| 7,514,390 B2 | 4/2009 | Chan | |
| 7,514,391 B2 | 4/2009 | Chan | |
| 7,533,723 B2 | 5/2009 | Hughes et al. | |
| 7,543,644 B2 | 6/2009 | Huang et al. | |
| 7,543,646 B2 | 6/2009 | Huang et al. | |
| 7,547,665 B2 | 6/2009 | Welton et al. | |
| 7,552,771 B2 | 6/2009 | Eoff et al. | |
| 7,559,369 B2 | 7/2009 | Roddy et al. | |
| 7,581,594 B2 | 9/2009 | Tang | |
| 7,615,516 B2 | 11/2009 | Yang et al. | |
| 7,621,334 B2 | 11/2009 | Welton et al. | |
| 7,622,436 B2 | 11/2009 | Tuzi et al. | |
| 7,655,603 B2 | 2/2010 | Crews | |
| 7,677,311 B2 | 3/2010 | Abad et al. | |
| 7,687,439 B2 | 3/2010 | Jones et al. | |
| 7,709,421 B2 | 5/2010 | Jones et al. | |
| 7,712,534 B2 | 5/2010 | Bryant et al. | |
| 7,727,936 B2 | 6/2010 | Pauls et al. | |
| 7,727,937 B2 | 6/2010 | Pauls et al. | |
| 7,730,958 B2 | 6/2010 | Smith | |
| 7,825,073 B2 | 11/2010 | Welton et al. | |
| 7,833,943 B2 | 11/2010 | Van Zanten et al. | |
| 7,838,467 B2 | 11/2010 | Jones et al. | |
| 7,846,877 B1 | 12/2010 | Robb | |
| 7,851,414 B2 | 12/2010 | Yang et al. | |
| 7,855,168 B2 | 12/2010 | Fuller et al. | |
| 7,857,051 B2 | 12/2010 | Abad et al. | |
| 7,886,824 B2 | 2/2011 | Kakadjian et al. | |
| 7,893,010 B2 | 2/2011 | Ali et al. | |
| 7,902,123 B2 | 3/2011 | Harrison et al. | |
| 7,906,464 B2 | 3/2011 | Davidson | |
| 7,910,524 B2 | 3/2011 | Welton et al. | |
| 7,931,088 B2 | 4/2011 | Stegemoeller et al. | |
| 7,960,314 B2 | 6/2011 | Van Zanten et al. | |
| 7,960,315 B2 | 6/2011 | Welton et al. | |
| 7,963,720 B2 | 6/2011 | Hoag et al. | |
| 7,971,659 B2 | 7/2011 | Gatlin et al. | |
| 7,976,241 B2 | 7/2011 | Hoag et al. | |
| 7,989,404 B2 | 8/2011 | Kakadjian et al. | |
| 7,992,656 B2 | 8/2011 | Dusterhoft et al. | |
| 7,998,911 B1 | 8/2011 | Berger et al. | |
| 8,043,996 B2 | 10/2011 | Harris | |
| 8,053,396 B2 | 11/2011 | Huff et al. | |
| 8,053,397 B2 | 11/2011 | Huang et al. | |
| 8,057,682 B2 | 11/2011 | Hoag et al. | |
| 8,091,644 B2 | 1/2012 | Clark et al. | |
| 8,091,645 B2 | 1/2012 | Quintero et al. | |
| 8,091,646 B2 | 1/2012 | Quintero et al. | |
| 8,100,190 B2 | 1/2012 | Weaver et al. | |
| 8,148,303 B2 | 4/2012 | Van Zanten et al. | |
| 8,183,182 B2 | 5/2012 | Oliveira et al. | |
| 8,206,062 B2 | 6/2012 | Hoag et al. | |
| 8,207,096 B2 | 6/2012 | van Zanten et al. | |
| 8,210,263 B2 | 7/2012 | Quintero et al. | |
| 8,220,546 B2 | 7/2012 | Kakadjian et al. | |
| 8,227,382 B2 | 7/2012 | Dakin et al. | |
| 8,231,947 B2 | 7/2012 | Vaidya et al. | |
| 8,235,120 B2 | 8/2012 | Quintero et al. | |
| 8,242,059 B2 | 8/2012 | Sawdon | |
| 8,293,687 B2 | 10/2012 | Giffin | |
| 8,342,241 B2 | 1/2013 | Hartshorne et al. | |
| 8,349,771 B2 | 1/2013 | Seth et al. | |
| 8,356,667 B2 | 1/2013 | Quintero et al. | |
| 8,357,639 B2 | 1/2013 | Quintero et al. | |
| 8,372,789 B2 | 2/2013 | Harris et al. | |
| 8,383,560 B2 | 2/2013 | Pich et al. | |
| 8,403,051 B2 | 3/2013 | Huang et al. | |
| 8,404,623 B2 | 3/2013 | Robb et al. | |
| 8,413,721 B2 | 4/2013 | Welton et al. | |
| 8,415,279 B2 | 4/2013 | Quintero et al. | |
| 8,431,620 B2 | 4/2013 | Del Gaudio et al. | |

(56) References Cited

U.S. PATENT DOCUMENTS

| | | |
|---|---|---|
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1* | 9/2003 | Pursley et al. ............... 507/200 |
| 2003/0232095 A1 | 12/2003 | Garti et al. |
| 2006/0014648 A1 | 1/2006 | Milson et al. |
| 2006/0211593 A1 | 9/2006 | Smith et al. |
| 2006/0258541 A1* | 11/2006 | Crews ........................ 507/203 |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0066918 A1* | 3/2008 | Smith ........................ 166/308.2 |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0200027 A1* | 8/2009 | Kakadjian et al. ........ 166/270.1 |
| 2009/0221456 A1 | 9/2009 | Harrison et al. |
| 2009/0242196 A1* | 10/2009 | Pao ............................ 166/248 |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0096139 A1* | 4/2010 | Holcomb et al. ........... 166/308.1 |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0226471 A1* | 9/2011 | Wattenbarger et al. ....... 166/263 |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0125616 A1* | 5/2012 | Graue ........................ 166/305.1 |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0284057 A1 | 9/2014 | Champagne et al. |
| 2014/0332212 A1 | 11/2014 | Ayers et al. |
| 2014/0367107 A1 | 12/2014 | Hill et al. |
| 2015/0105302 A1 | 4/2015 | Pursley et al. |
| 2015/0247082 A1 | 9/2015 | Rea |
| 2015/0247381 A1 | 9/2015 | Pursley et al. |
| 2015/0247392 A1 | 9/2015 | Portwood |
| 2015/0329767 A1 | 11/2015 | Vaughn et al. |
| 2016/0003018 A1 | 1/2016 | Saboowala et al. |
| 2016/0017204 A1 | 1/2016 | Hill et al. |
| 2016/0024891 A1 | 1/2016 | Fursdon-Welsh et al. |
| 2016/0032172 A1 | 2/2016 | Pursley et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |

OTHER PUBLICATIONS

[No Author Listed], The HLB system: a time-saving guide to emulsifier selection. ICI Americas Inc. 1976. 22 pages.

ADM, Evolution Chemicals E5786-117 Description. Jun. 2014.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Whisonant et al., Combining Continuous Improvements in Acid Fracturing, Propellant Stimulations, and Polymer Technologies to (56) References Cited

OTHER PUBLICATIONS

Increase Production and Develop Additional Reserves in a Mature Oil Field. Society of Petroleum Engineers. Oct. 1997; vol. 38789. 9 pages.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

\* cited by examiner

FIG. 1

PRIOR ART

FIG. 2

PRIOR ART

FIG. 3

SYSTEMS AND METHODS FOR THE TREATMENT OF OIL AND/OR GAS WELLS WITH AN OBSTRUCTION MATERIAL

RELATED APPLICATIONS

This application claims priority under 35 U.S.C. § 119(e) to U.S. Provisional Patent Application, U.S. Ser. No. 61/945,935, filed Feb. 28, 2014, entitled "Systems and Methods for the Treatment of Oil and/or Gas Wells With an Obstruction Material," which is incorporated herein by reference in its entirety.

TECHNICAL FIELD

Systems and methods for the treatment of oil and/or gas wells are generally described.

BACKGROUND

Injection of a drive fluid (e.g., flooding) is often used to displace oil and/or gas from reservoirs. The drive fluid (e.g., water, carbon dioxide, chemical) is used to physically sweep the oil and/or gas in the reservoir to an adjacent production well. However, in some instances, a portion of the oil and/or gas remains in the reservoir after one or more injections of drive fluid. In addition, some of the drive fluid may clean out or "sweep" a sub-region of the hydrocarbon bearing formation. The fluid impedance generally decreases in this swept zone. No matter how much more drive fluid is added, the drive fluid will generally flow through the swept path since it has the lowest resistance. The swept zone is the zone that is the target area to be plugged or blocked with an obstruction material (e.g., polymer), thereby diverting the drive fluid to other areas of the reservoir.

SUMMARY

Systems and methods for the treatment of oil and/or gas wells are provided. The subject matter of the present invention involves, in some cases, interrelated products, alternative solutions to a particular problem, and/or a plurality of different uses of one or more systems and/or articles.

In one set of embodiments, methods are provided. In some embodiments, a method comprises treating a well with a first fluid comprising a microemulsion before treating the well with a second fluid comprising an obstruction material (e.g., a polymer and/or a foam).

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems and methods for the treatment of oil and/or gas wells are generally described.

In some embodiments, in an oil and/or gas well, a drive fluid (e.g., water, carbon dioxide, chemical) is injected into an injection well and used to physically sweep the oil and/or gas in a reservoir to an adjacent production well. However, in some embodiments, the reservoir may contain regions that differ in permeability to the drive fluid used to displace the hydrocarbons (also referred to herein as oil and/or gas). The higher permeability region(s) of the reservoir may limit oil and/or gas recovery from at least one lower permeability region (e.g., as the drive fluid preferentially flows through the regions of higher permeability). Accordingly, in some embodiments, techniques are utilized to decrease the permeability of the higher permeability region(s) so that the drive fluid then preferentially flows through the regions which were previously of lower permeability, and thus, aid in the recovery of the hydrocarbons from those regions. Such techniques include obstructing the regions of higher permeability using an obstruction material (e.g., a polymer such as a polymer gel).

Figure 1:
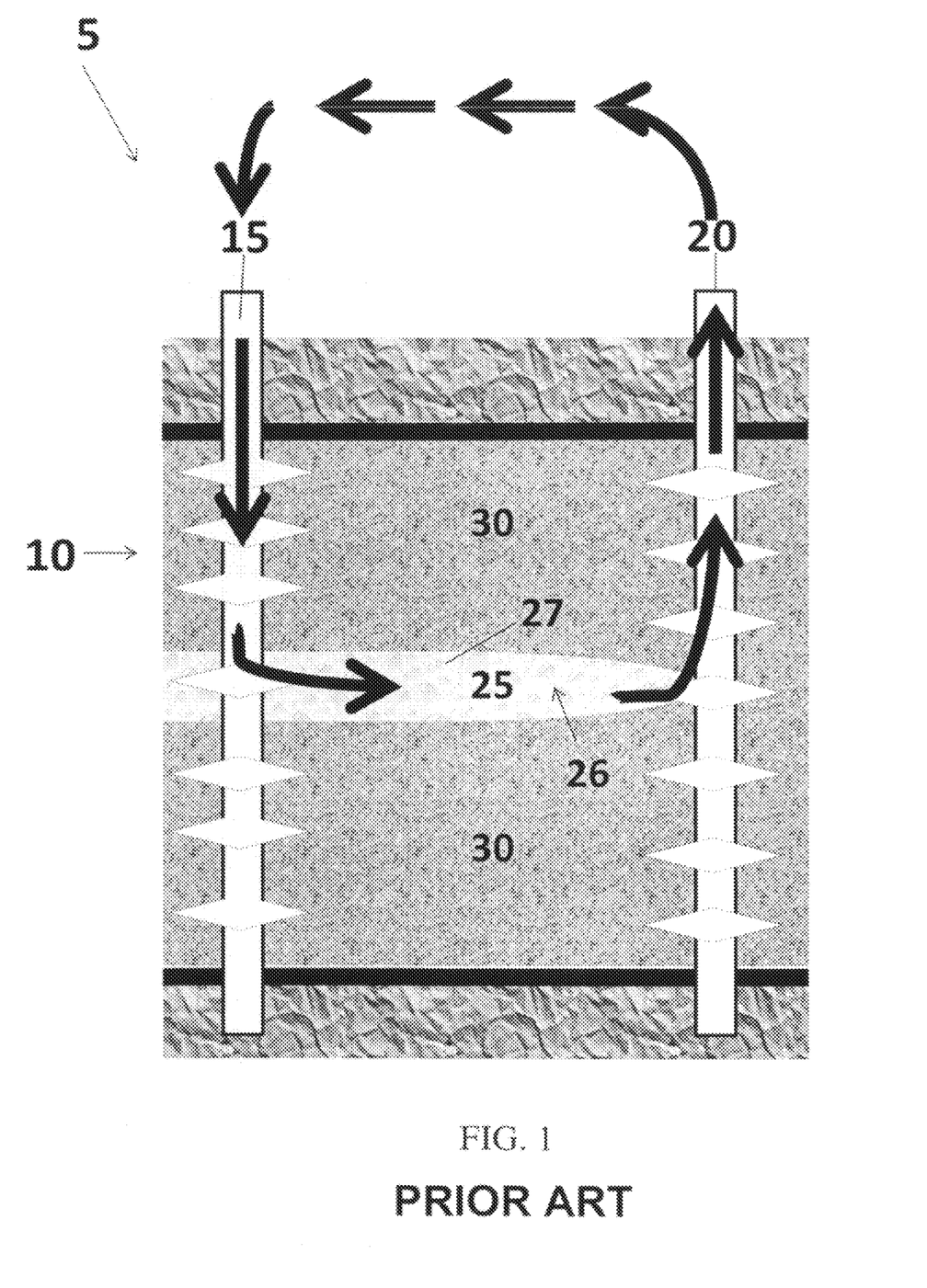
FIG. 1 shows a schematic of a well, according to certain embodiments.
Figure 2:
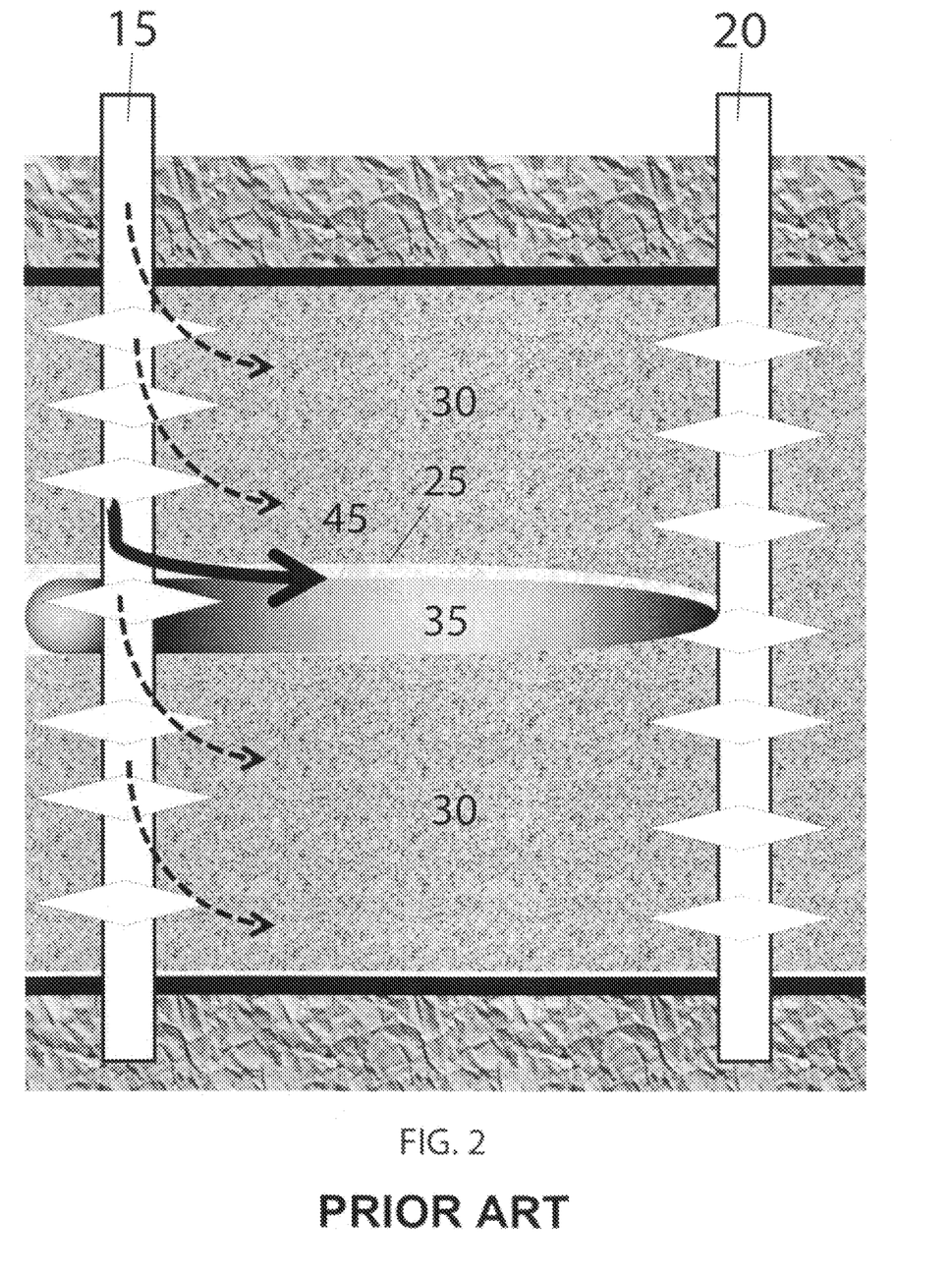
FIGS. 2 and 3 show a schematic of a well comprising an obstruction, according to some embodiments.
Figure 3:
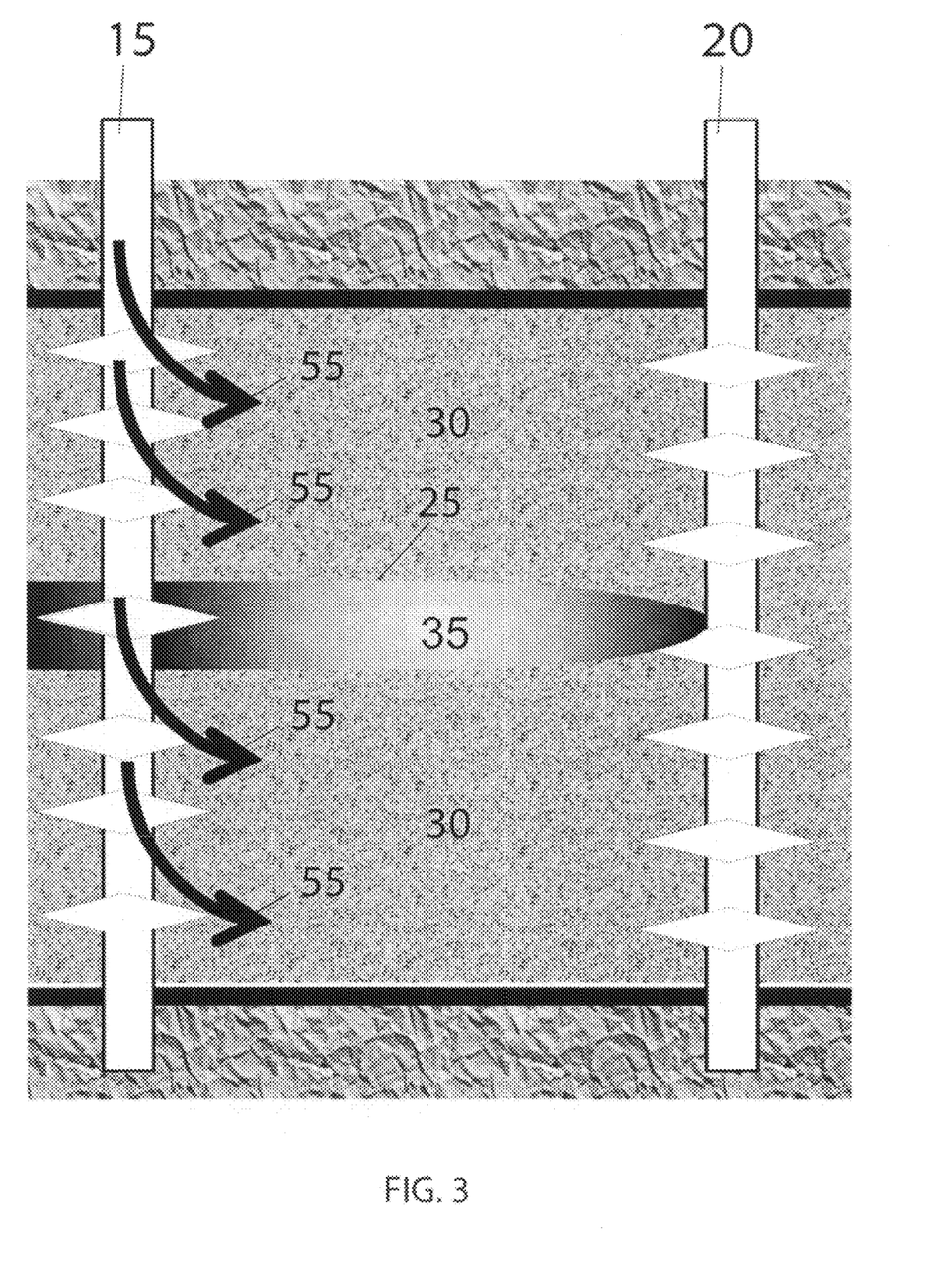

A non-limiting example of a reservoir having a substantial variation in the permeability to a drive fluid within the hydrocarbon bearing formation (e.g., rock, shale, sandstone, sand) is shown in FIGS. 1-3. As illustrated in FIG. 1, an oil well 5 may include a reservoir 10 comprising an injection well 15 and a production well 20. The reservoir may contain at least one region 25 of relatively high permeability and one or more regions 30 of relatively low permeability. A drive fluid may be injected into the injection well and displaced hydrocarbon may be collected from a production well. The injection and recovery process may be performed any suitable number of time as illustrated by the arrows. In this figure, the drive fluid preferentially flows through region 25 having relatively high permeability as compared to regions 30.

As illustrated in FIG. 1, the injected drive fluid 27 may follow the path of least resistance, such that most of the drive fluid 27 flows through the region 25 that has the highest permeability and/or lowest impedance to the drive fluid. In embodiments in which the reservoir contains mobile hydrocarbon, the mobile hydrocarbon in high permeability region 25 may be displaced at a faster rate than the regions 30 having a lower permeability. As the hydrocarbon is displaced from region 25, the resistance to fluid flow in region 25 due to the presence of hydrocarbon may decrease causing the permeability of the region 25 to the drive fluid to increase. In certain embodiments, the relatively low resistance of the high permeability region 25 may allow the drive fluid to breakthrough prematurely at a production well before the low permeability regions 30 can be adequately processed. The premature breakthrough may create a "short circuit" 26 between the injection well and a production well that allows the drive fluids to "cycle" through regions of the reservoir that have already been swept and to by-pass at least a portion of the regions that contain most of the remaining mobile oil and/or gas (e.g., lower permeability regions 30). In some embodiments, unless the injected drive fluid can be redistributed throughout the lower permeability regions, the recovery performance may be compromised and significant hydrocarbon reserves may be stranded when the field is closed and/or abandoned. It should be understood that the term hydrocarbon encompasses oil (e.g., liquid oil), gas (e.g., gas condensates), other liquid phase material, e.g., that may be liquid phase due to pressure and/or temperature, or predominantly solid phase material such as bitumen that becomes liquid phase at specific temperature.

Conventional methods, as illustrated in FIG. 2, have tried to address this problem by obstructing the short circuit. For example, as illustrated in FIG. 2, an obstruction material 35 (e.g., polymer material) may be injected to the reservoir and allowed to fill at least a portion of the high permeability region 25. However, in some embodiments, the remaining oil and/or gas in region 25 may prevent the material from adequately adhering to the reservoir, thereby reducing the ability of the material to obstruct the area of high permeability. As illustrated in FIG. 2, at least a portion of the material 35 may not fill the region 25, such that a substantial amount of the drive fluid continues to flows through region 25 as illustrated by arrow 45. Conventional methods have tried to address the adherence problem through the use treatments comprising surfactants. However, with the use of conventional surfactant, a majority of the formation is left untreated and the adherence problem remains.

It has been discovered, within the context of the present invention, that treating a reservoir containing relatively high and relatively low permeability region with a fluid comprising a microemulsion prior to injection of an obstruction material provides many benefits as compared to injection of an obstruction material alone. For example, injection of a fluid comprising a microemulsion may prevent the drive fluid from re-entering the obstructed high permeability region. For example, in certain embodiments, the microemulsion may dislodge and/or remove at least a portion of the hydrocarbons in the higher permeability region(s) that remains after one or more injections of the drive fluid. In some embodiments, treating the well with a fluid comprising a microemulsion may increase the overall production of the oil and/or gas well. This may be due to, for example, the microemulsion interacting with any residual hydrocarbon in the walls of the high permeability regions, thereby aiding in the removal of the hydrocarbon (e.g., by altering the interfacial tension so the hydrocarbon is released from the walls, by dissolution of the hydrocarbon, etc.). In some such embodiments, the microemulsion may remove and/or dislodge the oil and/or gas that cannot be removed by conventional treatments (e.g., drive fluids, surfactants) and thereby reduce the volume of residual oil in a region.

In some embodiments, the dislodgement and/or removal of at least a portion of the remaining hydrocarbons prior to obstructing one or more region of the reservoir may enhance the barrier properties of the resulting obstruction. For instance, the obstruction material may have enhanced adhesion to the reservoir and a greater resistance to fluid flow, amongst other properties. It is believed, that the obstruction material (e.g., polymer), and accordingly the obstruction, adheres better to surfaces that are relatively free of oil. Therefore, the adherence characteristics of the obstruction material may depend on the percentage and/or amount of residual oil that remains on the surfaces of the hydrocarbon bearing structure. In some embodiments, the fluid comprising a microemulsion reduces the volume of residual oil in a region and/or the amount of hydrocarbon on the hydrocarbon bearing structures and creates more bondable surface area for the obstruction material.

For example, as illustrated in FIG. 3, the obstruction material (e.g., polymer slug, polymer plug) 35 injected after the microemulsion treatment may adequately adhere to the reservoir such that at least one high permeability region 25 is substantially obstructed and at least a portion (e.g., substantially all) of the drive fluid flows through the lower permeability regions, as indicated by arrows 55, after injection of an obstructions material.

As described herein, a well may contain a reservoir having a region with a high permeability to a drive fluid relative to other regions in the reservoir. A method of enhancing oil and/or gas recovery in such a reservoir may comprise treating a well with a fluid comprising a microemulsion prior to obstructing one or more region (e.g., higher permeability regions) of the reservoir by injection of an obstruction material. For example, a method for enhancing gas and/or oil recovery may comprise treating the well with a first fluid comprising a microemulsion prior to treating the well with a second fluid comprising a polymer and/or a foam. In some embodiments, the well may be treated with a microemulsion immediately prior to the treatment with a fluid comprising a polymer and/or foam designed to obstruct at least a portion of at least one region. In other embodiments, the treatment with the microemulsion may occur less than 10 (e.g., less than 9, less than 8, less than 7, less than 6, less than 5, less than 4, less than 3, less than 2) treatments before the treatment with the obstruction material (e.g., polymer). The fluid comprising a microemulsion may be added to the well (e.g., injected) after at least a portion of the oil and/or gas in the high permeability region of the reservoir has been removed. In certain embodiments, the well may be treated with the fluid comprising the microemulsion after the well has undergone one or more treatments with a drive fluid.

It should be understood, that while much of the following disclosure focuses on an obstruction material comprising a polymer, this is by no means limiting and other obstruction material may be employed (e.g., a foam).

In some embodiments, at least a portion of the drive fluid may preferentially flow through a high permeability region (e.g., a region with the least fluid impedance) and displace a portion of the oil and/or gas within the high permeability region. In some instances, a large percentage (e.g., between about 50% to about 95%, between about 50% to about 90%, between about 50% to about 80%, between about 60% to about 90%, between about 60% to about 80%) of the initial amount of the oil and/or gas in the high permeability may be removed from the high permeability region of reservoir by the drive fluid. In some such embodiments, a relatively small percentage (e.g., less than about 50%, less than about 40%, less than about 30%, less than about 25%, less than about 20%, less than about 15%, less than about 10%, less than about 5%, less than about 1%) of the initial amount of oil and/or gas in at least one region of the reservoir that has a lower permeability than the high permeability region may be removed by the drive fluid. As used herein, the initial amount of oil and/or gas refers to the amount of oil and/or in the hydrocarbon bearing formation prior to treatment with a drive fluid. In some instances, the initial amount may be the amount before the first treatment with drive fluid. In other instances, the initial amount may be the amount after one or more prior treatments with drive fluid.

In some embodiments, at least a portion of the fluid comprising a microemulsion that is added (e.g., injected) to the well may flow within the same region (e.g., the high permeability region) as the drive fluid. Without wishing to be bound by theory, it is believed that the fluid comprising the microemulsion will flow in the region with the least fluid impedance, which is the region where the drive fluid displaced at least a portion of the mobile oil and/or gas. It is believed that a significant percentage (at least about 50%, at least about 55%, at least about 60%, at least about 65%, at least about 70%) of the initial amount of oil and/or gas in the reservoir will remain in the region of least impedance. In some embodiments, the residual oil and/or gas may occupy at least 5% (at least about 10%, at least about 25%, at least about 40%, at least about 50%) of the volume in the region of least impedance to fluid flow. It should be understood that the percentage of initial oil and/or gas may refer to the amount of oil and/or gas that is present in the region, reservoir, and/or well prior to treatment with a drive fluid. Those of ordinary skill in the art would be knowledgeable of methods to determine the percentage of oil and/or gas that has been removed and/or remains in a region of an oil and/or gas well.

In certain embodiments, the microemulsion may remove at least a portion of the residual oil and/or gas remaining in the region after the one or more treatments with the drive fluid. In certain embodiments, the residual oil and/or gas remaining in the region (high permeability) may be effectively blocked to removal by additional treatments with the drive fluid. For instance, additional treatments with the drive fluid may remove less than or equal to about 3%, less than or equal to about 1%, less than or equal to about 0.5%, less than or equal to about 0.1%, less than or equal to about 0.05%, or less than or equal to about 0.01% of the residual oil and/or gas in the region. Without wishing to be bound by theory, the decreased ability (e.g., immobility) of the residual oil and/or gas to additional drive fluid treatments may be due to surface tension and/or interfacial tension. For example, a relatively low surface tension may exist between the hydrocarbon bearing structure (e.g., rock, shale, sandstone, sand) and the residual hydrocarbon, whereas a relatively high interfacial tension may exist between the residual hydrocarbon and the drive fluid, such that the drive fluid that is forced through the region does not have the requisite energy to overcome the surface and/or interfacial tension and displace the residual hydrocarbon from the surface of the hydrocarbon bearing structure.

In some embodiments, injection of a fluid comprising a microemulsion may change the surface and/or interfacial tension between the hydrocarbon bearing surface, the hydrocarbon, and/or the drive fluid. In certain embodiments, the microemulsion may increase the surface tension between the hydrocarbon bearing structure (e.g., rock, shale, sandstone, sand) and the residual hydrocarbon. Without being bound by theory, it is believed that as the microemulsion increases the surface tension, the contact angle between the hydrocarbon bearing surface and the residual hydrocarbon decreases. It is believed that when the contact area between the surface and the residual hydrocarbon becomes smaller, the residual hydrocarbon becomes easier to remove with a drive fluid as less energy is required to overcome the surface and/or interfacial tension to remove the residual hydrocarbon. It is also believed that change in surface and/or interfacial tension caused by the introduction of the microemulsion allows the hydrocarbon bearing surface to be wetted with a drive fluid and/or occupy space within the areas of the reservoir that was previously occupied by residual oil and/or gas.

In some embodiments, the microemulsion may be able to access more surface area of the region than the drive fluid and/or conventional well treatments (e.g., surfactant treatment). In certain embodiments, the microemulsion may mobilize a relatively large percentage (e.g., at least about 70%, at least about 75%, at least about 80%, at least about 85%, at least about 90%) of the residual oil and/or gas in the region of the reservoir that had the least impedance to the flow of drive fluid. In some instances, the microemulsion may mobilize substantially all the residual oil and/or gas in the region. In some embodiments, microemulsion may dislodge and/or remove oil and/or gas that cannot be readily removed by a drive fluid and/or conventional well treatments (e.g., fluid floods, surfactants). The additional oil and/or gas removed by the microemulsion may also increase the production of the well.

As described herein, a well may be treated with a fluid comprising a microemulsion prior to treatment with a fluid comprising an obstruction material. In certain embodiments, a fluid comprising a polymer (e.g., polymer slug, polymer plug, gel polymer) may be used to obstruct a high permeability region (e.g., the region with the least impedance to the drive fluid). In some embodiments, the polymer may adhere to structures (e.g., formation) in the region of the reservoir and form a polymer material (e.g., solid material, semi-solid material; gelled material) that creates a barrier to fluid flow. In certain embodiments, the ability of the obstruction to resistance fluid flow is dependent on the adherence of the polymer to the structures of the region, gel strength, polymer concentration, and the volume of the region that is occupied by polymer material. Regions (e.g., high permeability regions) that have been treated with the fluid comprising a microemulsion may have more surface area that can bind with the polymer material than essential identical region having undergoing essential identical treatments but lacking the microemulsion treatment described herein. In some embodiments, the polymer material formed after a treatment with a fluid comprising a microemulsion may be able to resist subsequent flow of drive fluid.

In some embodiments, an obstruction in a high permeability region may cause the drive fluid to distribute into and displace oil and/or gas from a region of lower permeability. In certain embodiments, the obstruction may allow oil and/or gas to be displaced from one or more previously by-passed regions of the reservoir.

In some embodiments, the obstruction material may be able to restrict substantially all fluid flow within a region (e.g., substantially all or a portion of the high permeability region). For instance, in some embodiments, at least about 50%, at least about 60%, at least about 70%, at least about 80%, at least about 90%, or at least about 95% of the fluid flow path of the region is obstructed. In some instances, the entire fluid flow path of the region is obstructed. In other instances, a portion of the fluid flow path of the region is obstructed, for example, the area closest to the producing well. In some embodiments, the obstruction material may be able to withstand a numerous fluid treatments (e.g., at least about 2, at least about 3, at least about 5, at least about 10, at least about 15. at least about 20) cycles and still restrict substantially all fluid flow within a region (e.g., substantially all or a portion of the high permeability region). In some embodiments, the obstruction material may act as a permanent plug and permanently restrict fluid flow within a region.

In some embodiments, the obstruction material and the fluid used to form the obstruction material may comprise a polymer. In general, any suitable polymer may be used to obstruct a region (e.g., high permeability region; region with the least impedance to drive fluid flow). In some embodiments, the polymer in the fluid may not degrade readily in the environmental conditions in the reservoir. In some instances, the polymer may be non-degradable, e.g., to microbes. In some embodiments, the polymer may be highly water soluble. Non-limiting examples of suitable polymers include ionic polymers (e.g., polyanionic cellulose) and polyacrylamides (e.g., anionic polyacrylamide). It should be understood that the fluid is not limited to comprising a single polymer. In general, the fluid may comprise any suitable number (e.g., 2, 3, 4, 5, 6, 8, 10) or combinations of polymers.

In some embodiment, the obstruction may be formed from a polymer in particulate form (e.g., powder). In some such cases, the polymer may be mixed with a fluid to form prior to injection into the hydrocarbon bearing structure. In certain embodiments, the polymer and fluid mixture may be cross-linked to form a gel. The gel may be injected into the hydrocarbon bearing structure. In general, the concentration of the polymer in the gel may be selected as desired for a given application.

In some embodiments, the polymer may be an anionic polymer. For example, the fluid comprising a polymer may comprise polyanionic cellulose. The polyanionic cellulose may have any suitable degree of substitution and/or viscosity. In some embodiments, the polyanionic cellulose may be in the form of a suspension. In another example, the fluid comprising a polymer may comprise anionic polyacrylamide. The anionic polyacrylamide may have any suitable degree of substitution and/or viscosity. In some embodiments, the anionic polyacrylamide may be in the form of a suspension. In some embodiments, the anionic polymer may have a relatively low charge density. For example, the average number of anions per repeat unit may be less than about 1 (e.g., less than about or equal to about 0.8, less than or equal to about 0.6, less than or equal to about 0.5, less than or equal to about 0.4, less than or equal to about 0.3, less than or equal to about 0.2).

In some embodiments, the polymer used to form the obstruction material may have a medium molecular weight. For example, the polymer may have a number-average molecular weight between about 50,000 g/mol and about 1,000,0000 g/mol, between about 50,000 g/mol and about 800,0000 g/mol, between about 50,000 g/mol and about 500,0000 g/mol, between about 50,000 g/mol and about 400,0000 g/mol, between about 75,000 g/mol and about 1,000,0000 g/mol, between about 100,000 g/mol and about 1,000,0000 g/mol, or between about 100,000 g/mol and about 400,0000 g/mol.

In some embodiments, the obstruction material and the fluid used to form the obstruction material may comprise a foam. In certain embodiments, the foam may comprise an emulsion or a microemulsion. For example, a microemulsion may be mixed with a gaseous material (e.g., carbon dioxide) to form a foam. In some cases, an emulsion or microemulsion, as described herein, may be used to make the foam.

In some embodiments, the systems and methods described herein comprise a microemulsion. In some embodiments, emulsions or microemulsion are provided. The terms should be understood to include emulsions or microemulsions that have a water continuous phase, or that have an oil continuous phase, or microemulsions that are bicontinuous or multiple continuous phases of water and oil.

It should be understood, that while the term microemulsion is generally used throughout, this is by no means limiting, and the systems, methods, and compositions and methods may alternatively comprise an emulsion.

It should be understood, that in embodiments where a microemulsion is employed, the microemulsion may be diluted and/or combined with other liquid component(s) prior to and/or during injection to form the fluid comprising the microemulsion. For example, in some embodiments, the microemulsion is diluted with an aqueous carrier fluid (e.g., water, brine, sea water, fresh water, or a well-treatment fluid (e.g., an acid, a fracturing fluid comprising polymers, sand, slick water, etc.) prior to and/or during injection into the wellbore. In general, the fluid comprising the microemulsion may include any suitable weight percentage of the microemulsion. For instance, in some embodiments, microemulsion is present in an amount between about 1 and about 100 gallons per thousand gallons of fluid ("gpt"), or between about 1 and about 4 gpt, or between about 2 and about 10 gpt. In certain embodiments, the microemulsion is present in an amount between about 2 and about 10 gpt. In some embodiments, microemulsion is present in an amount between about 2 and about 20 gpt, or between about 1 and about 50 gpt.

As used herein, the term "emulsion" is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term "microemulsion" is given its ordinary meaning in the art and refers to dispersions of one immiscible liquid in another, in the form of droplets, with diameters approximately in the range of between about 1 and about 1000 nm, or between 10 and about 1000 nanometers, or between about 10 and about 500 nm, or between about 10 and about 300 nm, or between about 10 and about 100 nm. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are stabilized microemulsions that are formed by the combination of a solvent-surfactant blend with an appropriate oil-based or water-based carrier fluid. Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some cases, the average droplet size ranges from about 10 nm to about 300 nm.

It should be understood, that while much of the description herein focuses on microemulsions, this is by no means limiting, and emulsions may be employed where appropriate.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

In some embodiments, a microemulsion comprises water, a solvent, and a surfactant. In some embodiments, the microemulsion may further comprise additional components, for example, a freezing point depression agent. Details of each of the components of the microemulsions are described in detail herein. In some embodiments, the components of the microemulsions are selected so as to reduce or eliminate the hazards of the microemulsion to the environment and/or the subterranean reservoirs.

The microemulsion generally comprises a solvent. The solvent, or a combination of solvents, may be present in the microemulsion in any suitable amount. In some embodiments, the total amount of solvent present in the microemulsion is between about 2 wt % and about 60 wt %, or between about 5 wt % and about 40 wt %, or between about 5 wt % and about 30 wt %, versus the total microemulsion composition.

The water to solvent ratio in a microemulsion may be varied. In some embodiments, the ratio of water to solvent by weight, along with other parameters of the solvent may be varied. In some embodiments, the ratio of water to solvent by weight is between about 15:1 and 1:10, or between 9:1 and 1:4, or between 3.2:1 and 1:4.

In some embodiments, the solvent is an unsubstituted cyclic or acyclic, branched or unbranched alkane having 6-12 carbon atoms. In some embodiments, the cyclic or acyclic, branched or unbranched alkane has 6-10 carbon atoms. Non-limiting examples of unsubstituted acyclic unbranched alkanes having 6-12 carbon atoms include hexane, heptane, octane, nonane, decane, undecane, and dodecane. Non-limiting examples of unsubstituted acyclic branched alkanes having 6-12 carbon atoms include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), and isomers of ethylmethylpentane (e.g., 3-ethyl-2-methylpentane, 3-ethyl-3-methylpentane). Non-limiting examples of unsubstituted cyclic branched or unbranched alkanes having 6-12 carbon atoms, include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, and cyclodecane. In a particular embodiment, the unsubstituted cyclic or acyclic, branched or unbranched alkane having 6-12 carbon is selected from the group consisting of heptane, octane, nonane, decane, 2,2,4-trimethylpentane (isooctane), and propylcyclohexane.

In some embodiments, the solvent is an unsubstituted acyclic branched or unbranched alkene having one or two double bonds and 6-12 carbon atoms. In some embodiments, the solvent is an unsubstituted acyclic branched or unbranched alkene having one or two double bonds and 6-10 carbon atoms. Non-limiting examples of unsubstituted acyclic unbranched alkenes having one or two double bonds and 6-12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, and isomers of dodecadiene. In some embodiments, the acyclic unbranched alkene having one or two double bonds and 6-12 carbon atoms is an alpha-olefin (e.g., 1-hexene, 1-heptene, 1-octene, 1-nonene, 1-decene, 1-undecene, 1-dodecene). Non-limiting examples unsubstituted acyclic branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, and isomers of methylethylheptene. In a particular embodiment, the unsubstituted acyclic unbranched alkene having one or two double bonds and 6-12 carbon atoms is selected from the group consisting of 1-octene and 1,7-octadiene.

In some embodiments, the solvent is a cyclic or acyclic, branched or unbranched alkane having 9-12 carbon atoms and substituted with only an —OH group. Non-limiting examples of cyclic or acyclic, branched or unbranched alkanes having 9-12 carbon atoms and substituted with only an —OH group include isomers of nonanol, isomers of decanol, isomers of undecanol, and isomers of dodecanol. In a particular embodiment, the cyclic or acyclic, branched or unbranched alkane having 9-12 carbon atoms and substituted with only an —OH group is selected from the group consisting of 1-nonanol and 1-decanol.

In some embodiments, the solvent is a branched or unbranched dialkylether compound having the formula $C_nH_{2n+1}OC_mH_{2m+1}$ wherein n+m is between 6 and 16. In some cases, n+m is between 6 and 12, or between 6 and 10, or between 6 and 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialklyether is an isomer $C_6H_{13}OC_6H_{13}$ (e.g., dihexylether).

In some embodiments, the solvent is an aromatic solvent having a boiling point between about 300-400° F. Non-limiting examples of aromatic solvents having a boiling point between about 300-400° F. include butylbenzene, hexylbenzene, mesitylene, light aromatic naphtha, and heavy aromatic naphtha.

In some embodiments, the solvent is a cyclic or acyclic, branched or unbranched alkane having 8 carbon atoms and substituted with only an —OH group. Non-limiting examples of cyclic or acyclic, branched or unbranched alkanes having 8 carbon atoms and substituted with only an —OH group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, and isomers of trimethylpentanol. In a particular embodiment, the cyclic or acyclic, branched or unbranched alkane having 8 carbon atoms and substituted with only an —OH group is selected from the group consisting of 1-octanol and 2-ethyl-1-hexanol.

In some embodiments, the solvent is an aromatic solvent having a boiling point between about 175-300° F. Non-limiting examples of aromatic liquid solvents having a boiling point between about 175-300° F. include benzene, xylenes, and toluene. In a particular embodiment, the solvent is not xylene.

In some embodiments, at least one of the solvents present in the microemulsion is a terpene or a terpenoid. In some embodiments, the terpene or terpenoid comprises a first type of terpene or terpenoid and a second type of terpene or terpenoid. Terpenes may be generally classified as monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products (e.g., see Ullmann's Encyclopedia of Industrial Chemistry, 2012, pages 29-45, herein incorporated by reference). It should be understood, that while much of the description herein focuses on terpenes, this is by no means limiting, and terpenoids may be employed where appropriate. In some cases, the terpene is a naturally occurring terpene. In some cases, the terpene is a non-naturally occurring terpene and/or a chemically modified terpene (e.g., saturated terpene, terpene amine, fluorinated terpene, or silylated terpene).

In some embodiments, the terpene is a monoterpene. Monoterpenes may be further classified as acyclic, monocyclic, and bicyclic (e.g., with a total number of carbons in the range between 18 and 20), as well as whether the monoterpene comprises one or more oxygen atoms (e.g., alcohol groups, ester groups, carbonyl groups, etc.). In some embodiments, the terpene is an oxygenated terpene, for example, a terpene comprising an alcohol, an aldehyde, and/or a ketone group. In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpeneol, α-pinene, nopol, and eucalyptol. In one embodiment, the terpene is nopol. In another embodiment, the terpene is eucalyptol. In some embodiments, the terpene is not limonene (e.g., d-limonene). In some embodiments, the emulsion is free of limonene.

In some embodiments, the terpene is a non-naturally occurring terpene and/or a chemically modified terpene (e.g., saturated terpene). In some cases, the terpene is a partially or fully saturated terpene (e.g., p-menthane, pinane). In some cases, the terpene is a non-naturally occurring terpene. Non-limiting examples of non-naturally occurring terpenes include menthene, p-cymene, r-carvone, terpinenes (e.g., alpha-terpinenes, beta-terpinenes, gamma-terpinenes), dipentenes, terpinolenes, borneol, alpha-terpinamine, and pine oils.

In some embodiments, the terpene may be classified in terms of its phase inversion temperature ("PIT"). The term "phase inversion temperature" is given its ordinary meaning in the art and refers to the temperature at which an oil in water microemulsion inverts to a water in oil microemulsion (or vice versa). Those of ordinary skill in the art will be aware of methods for determining the PIT for a microemulsion comprising a terpene (e.g., see Strey, Colloid & Polymer Science, 1994. 272(8): p. 1005-1019; Kahlweit et al., Angewandte Chemie International Edition in English, 1985. 24(8): p. 654-668). The PIT values described herein were determined using a 1:1 ratio of terpene (e.g., one or more terpenes):de-ionized water and varying amounts (e.g., between about 20 wt % and about 60 wt %; generally, between 3 and 9 different amounts are employed) of a 1:1 blend of surfactant comprising linear $C_{12}$-$C_{15}$ alcohol ethoxylates with on average 7 moles of ethylene oxide (e.g., Neodol 25-7):isopropyl alcohol wherein the upper and lower temperature boundaries of the microemulsion region can be determined and a phase diagram may be generated. Those of ordinary skill in the art will recognize that such a phase diagram (e.g., a plot of temperature against surfactant concentration at a constant oil-to-water ratio) may be referred to as "fish" diagram or a Kahlweit plot. The temperature at the vertex is the PIT.

In certain embodiments, the solvent utilized in the emulsion or microemulsion herein may comprise one or more impurities. For example, in some embodiments, a solvent (e.g., a terpene) is extracted from a natural source (e.g., citrus), and may comprise one or more impurities present from the extraction process. In some embodiment, the solvent comprises a crude cut (e.g., uncut crude oil, for example, made by settling, separation, heating, etc.). In some embodiments, the solvent is a crude oil (e.g., naturally occurring crude oil, uncut crude oil, crude oil extracted from the wellbore, synthetic crude oil, etc.). In some embodiments, the solvent is a citrus extract (e.g., crude orange oil, orange oil, etc.).

The terpene may be present in the microemulsion in any suitable amount. In some embodiments, terpene is present in an amount between about In some embodiments, terpene is present in an amount between about 2 wt % and about 60 wt %, or between about 5 wt % and about 40 wt %, or between about 5 wt % and about 30 wt %, versus the total microemulsion composition. In some embodiments, the terpene is present in an amount between about 1 wt % and about 99 wt %, or between about 2 wt % and about 90 wt %, or between about 1 wt % and about 60 wt %, or between about 2 wt % and about 60 wt %, or between about 1 wt % and about 50 wt %, or between about 1 wt % and about 30 wt %, or between about 5 wt % and about 40 wt %, or between about 5 wt % and about 30 wt %, or between about 2 wt % and about 25 wt %, or between about 5 wt % and about 25 wt %, or between about 60 wt % and about 95 wt %, or between about 70 wt % or about 95 wt %, or between about 75 wt % and about 90 wt %, or between about 80 wt % and about 95 wt %, versus the total microemulsion composition.

The water to terpene ratio in a microemulsion may be varied, as described herein. In some embodiments, the ratio of water to terpene, along with other parameters of the terpene (e.g., phase inversion temperature of the terpene)

may be varied so that displacement of residual aqueous treatment fluid by formation gas and/or formation crude is preferentially stimulated. In some embodiments, the ratio of water to terpene by weight is between about 3:1 and about 1:2, or between about 2:1 and about 1:1.5. In other embodiments, the ratio of water to terpene is between about 10:1 and about 3:1, or between about 6:1 and about 5:1.

Generally, the microemulsion comprises an aqueous phase comprising water. The water may be provided from any suitable source (e.g., sea water, fresh water, deionized water, reverse osmosis water, water from field production). The water may be present in any suitable amount. In some embodiments, the total amount of water present in the microemulsion is between about 1 wt % about 95 wt %, or between about 1 wt % about 90 wt %, or between about 1 wt % and about 60 wt %, or between about 5 wt % and about 60 wt % or between about 10 and about 55 wt %, or between about 15 and about 45 wt %, versus the total microemulsion composition.

In some embodiments, at the emulsion or microemulsion may comprise mutual solvent which is miscible together with the water and the terpene. In some embodiments, the mutual solvent is present in an amount between about at 0.5 wt % to about 30% of mutual solvent. Non-limiting examples of suitable mutual solvents include ethylenegly-colmonobutyl ether (EGMBE), dipropylene glycol monomethyl ether, short chain alcohols (e.g., isopropanol), tetrahydrofuran, dioxane, dimethylformamide, and dimethylsulfoxide.

In some embodiments, the microemulsion comprises a surfactant. The microemulsion may comprise a single surfactant or a combination of two or more surfactants. For example, in some embodiments, the surfactant comprises a first type of surfactant and a second type of surfactant. The term "surfactant," as used herein, is given its ordinary meaning in the art and refers to compounds having an amphiphilic structure which gives them a specific affinity for oil/water-type and water/oil-type interfaces which helps the compounds to reduce the free energy of these interfaces and to stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges; however, the net charge of the surfactant can be positive, negative, or neutral, depending on the pH of the solution. Anionic surfactants generally possess a net negative charge. Cationic surfactants generally possess a net positive charge. Zwitterionic surfactants are generally not pH dependent. A zwitterion is a neutral molecule with a positive and a negative electrical charge, though multiple positive and negative charges can be present. Zwitterions are distinct from dipole, at different locations within that molecule.

In some embodiments, the surfactant is an amphiphilic block copolymer where one block is hydrophobic and one block is hydrophilic. In some cases, the total molecular weight of the polymer is greater than 5000 daltons. The hydrophilic block of these polymers can be nonionic, anionic, cationic, amphoteric, or zwitterionic.

The term surface energy, as used herein, is given its ordinary meaning in the art and refers to the extent of disruption of intermolecular bonds that occur when the surface is created (e.g., the energy excess associated with the surface as compared to the bulk). Generally, surface energy is also referred to as surface tension (e.g., for liquid-gas interfaces) or interfacial tension (e.g., for liquid-liquid interfaces). As will be understood by those skilled in the art, surfactants generally orient themselves across the interface to minimize the extent of disruption of intermolecular bonds (i.e. lower the surface energy). Typically, surfactants at an interface between polar and non-polar phases orient themselves at the interface such that the difference in polarity is minimized.

Those of ordinary skill in the art will be aware of methods and techniques for selecting surfactants for use in the microemulsions described herein. In some cases, the surfactant(s) are matched to and/or optimized for the particular oil or solvent in use. In some embodiments, the surfactant(s) are selected by mapping the phase behavior of the microemulsion and choosing the surfactant(s) that gives the desired range of stability. In some cases, the stability of the microemulsion over a wide range of temperatures is targeted as the microemulsion may be subject to a wide range of temperatures due to the environmental conditions present at the subterranean formation and/or reservoir.

Suitable surfactants for use with the compositions and methods described herein will be known in the art. In some embodiments, the surfactant is an alkyl polyglycol ether, for example, having 2-250 ethylene oxide (EO) (e.g., or 2-200, or 2-150, or 2-100, or 2-50, or 2-40) units and alkyl groups of 4 20 carbon atoms. In some embodiments, the surfactant is an alkylaryl polyglycol ether having 2-250 EO units (e.g., or 2-200, or 2-150, or 2-100, or 2-50, or 2-40) and 8 20 carbon atoms in the alkyl and aryl groups. In some embodiments, the surfactant is an ethylene oxide/propylene oxide (EO/PO) block copolymer having 2-250 EO or PO units (e.g., or 2-200, or 2-150, or 2-100, or 2-50, or 2-40). In some embodiments, the surfactant is a fatty acid polyglycol ester having 6 24 carbon atoms and 2-250 EO units (e.g., or 2-200, or 2-150, or 2-100, or 2-50, or 2-40). In some embodiments, the surfactant is a polyglycol ether of hydroxyl-containing triglycerides (e.g., castor oil). In some embodiments, the surfactant is an alkylpolyglycoside of the general formula R"—O—Zn, where R" denotes a linear or branched, saturated or unsaturated alkyl group having on average 8-24 carbon atoms and Zn denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 8-18 carbon atoms, alkyl ether sulfates having 8-18 carbon atoms in the hydrophobic group and 1-40 ethylene oxide (EO) or propylene oxide (PO) units. In some embodiments, the surfactant is a sulfonate, for example, an alkyl sulfonate having 8-18 carbon atoms, an alkylaryl sulfonate having 8-18 carbon atoms, an ester, or half ester of sulfosuccinic acid with monohydric alcohols or alkylphenols having 4-15 carbon atoms, or a multisulfonate (e.g., comprising two, three, four, or more, sulfonate groups). In some cases, the alcohol or alkylphenol can also be ethoxylated with 1-250 EO units (e.g., or 2-200, or 2-150, or 2-100, or 2-50, or 2-40). In some embodiments, the surfactant is an alkali metal salt or ammonium salt of a carboxylic acid or poly(alkylene glycol) ether carboxylic acid having 8-20 carbon atoms in the alkyl, aryl, alkaryl or aralkyl group and 1-250 EO or PO units (e.g., or 2-200, or 2-150, or 2-100, or 2-50, or 2-40). In some embodiments, the surfactant is a partial phosphoric ester or the corresponding alkali metal salt or ammonium salt, e.g., an alkyl and alkaryl phosphate having 8-20 carbon atoms in the organic group, an alkylether phosphate or alkarylether phosphate having 8-20 carbon atoms in the alkyl or alkaryl group and 1-250 EO units (e.g., or 2-200, or 2-150, or 2-100, or 2-50, or 2-40). In some embodiments, the surfactant is a salt of primary, secondary, or tertiary fatty amine having 8 24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt). In some embodiments, the surfactant is amphoteric or zwitterionic, including sultaines (e.g., cocamidopropyl hydroxysultaine), betaines (e.g., cocamidopropyl betaine), or phosphates (e.g., lecithin). Non limiting examples of specific surfactants include a linear C12 C15 ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

In some embodiments, the surfactant is a siloxane surfactant as described in U.S. patent application Ser. No. 13/831,410 (now U.S. Publication No. 2014/0262288), filed Mar. 14, 2014, herein incorporated by reference.

In some embodiments, the surfactant is a Gemini surfactant. Gemini surfactants generally have the structure of multiple amphiphilic molecules linked together by one or more covalent spacers. In some embodiments, the surfactant is an extended surfactant, wherein the extended surfactants have the structure where a non-ionic hydrophilic spacer (e.g. ethylene oxide or propylene oxide) connects an ionic hydrophilic group (e.g. carboxylate, sulfate, phosphate).

In some embodiments the surfactant is an alkoxylated polyimine with a relative solubility number (RSN) in the range of 5-20. As will be known to those of ordinary skill in the art, RSN values are generally determined by titrating water into a solution of surfactant in 1,4dioxane. The RSN values are generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 daltons. The block copolymer may have a hydrophobic block that is comprised of a polymer chain that is linear, branched, hyperbranched, dendritic or cyclic. Non-limiting examples of monomeric repeat units in the hydrophobic chains of block copolymer surfactants are isomers of acrylic, methacrylic, styrenic, isoprene, butadiene, acrylamide, ethylene, propylene, and norbornene. The block copolymer may have a hydrophilic block that is comprised of a polymer chain that is linear, branched, hyper branched, dendritic or cyclic. Non-limiting examples of monomeric repeat units in the hydrophilic chains of the block copolymer surfactants are isomers of acrylic acid, maleic acid, methacrylic acid, ethylene oxide, and acrylamine.

Those of ordinary skill in the art will be aware of methods and techniques for selecting surfactant for use in the microemulsions described herein. In some cases, the surfactant(s) are matched to and/or optimized for the particular oil or solvent in use: In some embodiments, the surfactant(s) are selected by mapping the phase behavior of the microemulsion and choosing the surfactant(s) that gives the desired range of stability. In some cases, the stability of the microemulsion over a wide range of temperatures is targeting as the microemulsion may be subject to a wide range of temperatures due to the environmental conditions present at the subterranean formation.

In some embodiments, the emulsion or microemulsion may comprise one or more additives in addition to water, solvent (e.g., one or more types of solvents), and surfactant (e.g., one or more types of surfactants). In some embodiments, the additive is an alcohol, a freezing point depression agent, an acid, a salt, a proppant, a scale inhibitor, a friction reducer, a biocide, a corrosion inhibitor, a buffer, a viscosifier, a clay swelling inhibitor, an oxygen scavenger, and/or a clay stabilizer.

The surfactant may be present in the microemulsion in any suitable amount. In some embodiments, the surfactant is present in an amount between about 10 wt % and about 70 wt %, or between about 15 wt % and about 55 wt % versus the total microemulsion composition, or between about 20 wt % and about 50 wt %, versus the total microemulsion composition. In some embodiments, the surfactant is present in an amount between about 0 wt % and about 99 wt %, or between about 10 wt % and about 70 wt %, or between about 0 wt % and about 60 wt %, or between about 1 wt % and about 60 wt %, or between about 5 wt % and about 60 wt %, or between about 10 wt % and about 60 wt %, or between 5 wt % and about 65 wt %, or between 5 wt % and about 55 wt %, or between about 0 wt % and about 40 wt %, or between about 15 wt % and about 55 wt %, or between about 20 wt % and about 50 wt %, versus the total microemulsion composition.

In some embodiments, the microemulsion comprises an alcohol. The alcohol may serve as a coupling agent between the solvent and the surfactant and aid in the stabilization of the microemulsion. The alcohol may also lower the freezing point of the microemulsion. The microemulsion may comprise a single alcohol or a combination of two or more alcohols. In some embodiments, the alcohol is selected from primary, secondary, and tertiary alcohols having between 1 and 20 carbon atoms. In some embodiments, the alcohol comprises a first type of alcohol and a second type of alcohol. Non-limiting examples of alcohols include methanol, ethanol, isopropanol, n-propanol, n-butanol, i-butanol, sec-butanol, iso-butanol, and t-butanol. In some embodiments, the alcohol is ethanol or isopropanol. In some embodiments, the alcohol is isopropanol.

The alcohol may be present in the emulsion in any suitable amount. In some embodiments, the alcohol is present in an amount between about 0 wt % and about 50 wt %, or between about 0.1 wt % and about 50 wt %, or between about 1 wt % and about 50 wt %, or between about 5 wt % and about 40 wt %, or between about 5 wt % and 35 wt %, versus the total microemulsion composition.

In some embodiments, the microemulsion comprises a freezing point depression agent. The microemulsion may comprise a single freezing point depression agent or a combination of two or more freezing point depression agents. For example, in some embodiments, the freezing point depression agent comprises a first type of freezing point depression agent and a second type of freezing point depression agent. The term "freezing point depression agent" is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in the microemulsions described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea. In some embodiments, the microemulsion comprising the freezing point depression agent is stable over a wide range of temperatures, for example, between about −25° F. to 150° F., or between about −50° F. to 200° F.

The freezing point depression agent may be present in the microemulsion in any suitable amount. In some embodiments, the freezing point depression agent is present in an amount between about 1 wt % and about 40 wt %, or between about 3 wt % and about 20 wt %, or between about 8 wt % and about 16 wt %, versus the total microemulsion composition. In some embodiments, the freezing point depression agent is present in an amount between about 0 wt % and about 70 wt %, or between about 1 wt % and about 40 wt %, or between about 0 wt % and about 25 wt %, or between about 1 wt % and about 25 wt %, or between about 1 wt % and about 20 wt %, or between about 3 wt % and about 20 wt %, or between about 8 wt % and about 16 wt %, versus the total microemulsion composition.

Further non-limiting examples of other additives include proppants, scale inhibitors, friction reducers, biocides, corrosion inhibitors, buffers, viscosifiers, clay swelling inhibitors, paraffin dispersing additives, asphaltene dispersing additives, and oxygen scavengers.

Non-limiting examples of proppants (e.g., propping agents) include grains of sand, glass beads, crystalline silica (e.g., Quartz), hexamethylenetetramine, ceramic proppants (e.g., calcined clays), resin coated sands, and resin coated ceramic proppants. Other proppants are also possible and will be known to those skilled in the art.

Non-limiting examples of scale inhibitors include one or more of methyl alcohol, organic phosphonic acid salts (e.g., phosphonate salt), polyacrylate, ethane-1,2-diol, calcium chloride, and sodium hydroxide. Other scale inhibitors are also possible and will be known to those skilled in the art.

Non-limiting examples of buffers include acetic acid, acetic anhydride, potassium hydroxide, sodium hydroxide, and sodium acetate. Other buffers are also possible and will be known to those skilled in the art.

Non-limiting examples of corrosion inhibitors include isopropanol, quaternary ammonium compounds, thiourea/formaldehyde copolymers, propargyl alcohol, and methanol. Other corrosion inhibitors are also possible and will be known to those skilled in the art.

Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, AQUCAR™, UCAR-CIDE™, glutaraldehyde, sodium hypochlorite, and sodium hydroxide. Other biocides are also possible and will be known to those skilled in the art.

Non-limiting examples of clay swelling inhibitors include quaternary ammonium chloride and tetramethylammonium chloride. Other clay swelling inhibitors are also possible and will be known to those skilled in the art.

Non-limiting examples of friction reducers include petroleum distillates, ammonium salts, polyethoxylated alcohol surfactants, and anionic polyacrylamide copolymers. Other friction reducers are also possible and will be known to those skilled in the art.

Non-limiting examples of oxygen scavengers include sulfites, and bisulfites. Other oxygen scavengers are also possible and will be known to those skilled in the art.

Non-limiting examples of paraffin dispersing additives and asphaltene dispersing additives include active acidic copolymers, active alkylated polyester, active alkylated polyester amides, active alkylated polyester imides, aromatic naphthas, and active amine sulfonates. Other paraffin dispersing additives are also possible and will be known to those skilled in the art.

In some embodiments, for the formulations above, the other additives are present in an amount between about 0 wt % about 70 wt %, or between about 0 wt % and about 30 wt %, or between about 1 wt % and about 30 wt %, or between about 1 wt % and about 25 wt %, or between about 1 and about 20 wt %, versus the total microemulsion composition.

In some embodiments, the microemulsion comprises an acid or an acid precursor. For example, the microemulsion may comprise an acid when used during acidizing operations. The microemulsion may comprise a single acid or a combination of two or more acids. For example, in some embodiments, the acid comprises a first type of acid and a second type of acid. Non-limiting examples of acids or di-acids include hydrochloric acid, acetic acid, formic acid, succinic acid, maleic acid, malic acid, lactic acid, and hydrochloric-hydrofluoric acids. In some embodiments, the microemulsion comprises an organic acid or organic di-acid in the ester (or di-ester) form, whereby the ester (or diester) is hydrolyzed in the wellbore and/or reservoir to form the parent organic acid and an alcohol in the wellbore and/or reservoir. Non-limiting examples of esters or di-esters include isomers of methyl formate, ethyl formate, ethylene glycol diformate, $\alpha,\alpha$-4-trimethyl-3-cyclohexene-1-methylformate, methyl lactate, ethyl lactate, $\alpha,\alpha$-4-trimethyl 3-cyclohexene-1-methyllactate, ethylene glycol dilactate, ethylene glycol diacetate, methyl acetate, ethyl acetate, $\alpha,\alpha$,-4-trimethyl-3-cyclohexene-1-methylacetate, dimethyl succinate, dimethyl maleate, di($\alpha,\alpha$-4-trimethyl-3-cyclohexene-1-methyl)succinate, 1-methyl-4-(1-methylethenyl)-cyclohexylformate, 1-methyl-4-(1-ethylethenyl)cyclohexylactate, 1-methyl-4-(1-methylethenyl)cyclohexylacetate, di(1-methy-4-(1-methylethenyl)cyclohexyl)succinate.

In some embodiments, the microemulsion comprises a salt. The presence of the salt may reduce the amount of water needed as a carrier fluid, and in addition, may lower the freezing point of the microemulsion. The microemulsion may comprise a single salt or a combination of two or more salts. For example, in some embodiments, the salt comprises a first type of salt and a second type of salt. Non-limiting examples of salts include salts comprising K, Na, Br, Cr, Cs, or Li, for example, halides of these metals, including NaCl, KCl, $CaCl_2$, and $MgCl_2$.

In some embodiments, the microemulsion comprises a clay stabilizer. The microemulsion may comprise a single clay stabilizer or a combination of two or more clay stabilizers. For example, in some embodiments, the salt comprises a first type of clay stabilizer and a second type of clay stabilizer. Non-limiting examples of clay stabilizers include salts above, polymers (PAC, PHPA, etc), glycols, sulfonated asphalt, lignite, sodium silicate, and choline chloride.

In some embodiments, for the formulations above, the other additives are present in an amount between about 0 wt % and about 70 wt %, or between about 1 wt % and about 30 wt %, or between about 1 wt % and about 25 wt %, or between about 1 and about 20 wt %, versus the total microemulsion composition.

In some embodiments, the components of the microemulsion and/or the amounts of the components may be selected so that the microemulsion is stable over a wide-range of temperatures. For example, the microemulsion may exhibit stability between about −40° F. and about 400° F., or between −40° F. and about 300° F., or between about −40° F. and about 150° F. Those of ordinary skill in the art will be aware of methods and techniques for determining the range of stability of the microemulsion. For example, the lower boundary may be determined by the freezing point and the upper boundary may be determined by the cloud point and/or using spectroscopy methods. Stability over a wide range of temperatures may be important in embodiments where the microemulsions are being employed in applications comprising environments wherein the temperature may vary significantly, or may have extreme highs (e.g., desert) or lows (e.g., artic).

The microemulsions described herein may be formed using methods known to those of ordinary skill in the art. In some embodiments, the aqueous and non-aqueous phases may be combined (e.g., the water and the terpene(s)), followed by addition of a surfactant(s) and optionally other components (e.g., freezing point depression agent(s)) and agitation. The strength, type, and length of the agitation may be varied as known in the art depending on various factors including the components of the microemulsion, the quantity of the microemulsion, and the resulting type of microemulsion formed. For example, for small samples, a few seconds of gentle mixing can yield a microemulsion, whereas for larger samples, longer agitation times and/or stronger agitation may be required. Agitation may be provided by any suitable source, for example, a vortex mixer, a stirrer (e.g., magnetic stirrer), etc.

Any suitable method for injecting the microemulsion (e.g., a diluted microemulsion) into a wellbore may be employed. For example, in some embodiments, the microemulsion, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the microemulsion for a suitable period of time. The microemulsion and/or other fluids may be removed from the well using known techniques, including producing the well.

In some embodiments, the emulsion or microemulsion may be prepared as described in U.S. Pat. No. 7,380,606 and entitled "Composition and Process for Well Cleaning," herein incorporated by reference.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either,"

What is claimed is:

1. A method, comprising:
   treating a well in a hydrocarbon bearing formation with a first fluid comprising a microemulsion before treating the well with a second fluid comprising an obstruction material, wherein the first fluid comprising the microemulsion treats high permeability regions and low permeability regions of the well; and wherein the first fluid comprising the microemulsion reduces a volume of residual hydrocarbon in the high permeability regions and an amount of the residual hydrocarbon on surfaces of hydrocarbon bearing structures in the high permeability regions thereby creating additional bondable surface area for the obstruction material;

wherein the microemulsion is a homogeneous thermodynamically stable single phase; and wherein the microemulsion comprises a surfactant selected from the group consisting of cationic surfactants, nonionic surfactants and zwitterionic surfactants.

2. The method as in claim 1, wherein treating the well with the first fluid occurs immediately before treating the well with the second fluid.

3. The method as in claim 1, wherein the microemulsion comprises a terpene.

4. The method as in claim 1, wherein the well comprises a reservoir comprising a first region having a higher permeability than a second region.

5. The method as in claim 1, comprising treating the well with a drive fluid one or more times.

6. The method as in claim 5, wherein treating with the drive fluid occurs before treating with the first fluid.

7. The method as in claim 6, wherein the drive fluid comprises carbon dioxide.

8. The method as in claim 6, wherein the drive fluid comprises water.

9. The method as in claim 1, wherein treating the well with the first fluid comprises injecting the first fluid into the well.

10. The method as in claim 1, wherein the obstruction material is a polymer.

11. The method as in claim 10, wherein the polymer is an ionic polymer.

12. The method as in claim 1, wherein the obstruction material is a foam.

13. The method as in claim 1, wherein the surfactant is selected from the group consisting of cationic surfactants and nonionic surfactants.

* * * * *